US007050195B1

(12) United States Patent
Jones

(10) Patent No.: US 7,050,195 B1
(45) Date of Patent: May 23, 2006

(54) PRINTED MEDIUM DATA STORAGE

(75) Inventor: Michael J. Jones, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/556,965

(22) Filed: Apr. 20, 2000

(51) Int. Cl.
*G06F 15/00* (2006.01)
*G06K 1/00* (2006.01)

(52) U.S. Cl. .................. 358/1.9; 358/1.9; 358/3.1; 358/3.28; 358/540; 358/526; 358/502; 382/284; 382/172

(58) Field of Classification Search ............... 358/3.01, 358/3.28, 540, 526, 1.9, 502, 2.1, 448; 382/284, 382/172, 162, 164, 165
See application file for complete search history.

(56) References Cited

U.S. PATENT DOCUMENTS

| | | | | |
|---|---|---|---|---|
| 4,504,084 A | * | 3/1985 | Jauch ........................... 380/54 |
| 4,739,377 A | * | 4/1988 | Allen ........................... 355/133 |
| 4,930,018 A | | 5/1990 | Chan et al. ................... 358/298 |
| 4,967,203 A | | 10/1990 | Doan et al. .................... 346/1.1 |
| 5,031,050 A | | 7/1991 | Chan ........................... 358/298 |
| 5,168,552 A | * | 12/1992 | Vaughn et al. ................ 358/1.9 |
| 5,256,193 A | | 10/1993 | Winnik et al. .............. 106/21 A |
| 5,485,180 A | | 1/1996 | Askeland et al. .............. 347/15 |
| 5,488,664 A | | 1/1996 | Shamir ......................... 380/54 |
| 5,583,550 A | | 12/1996 | Hickman et al. .............. 347/41 |
| 5,621,810 A | | 4/1997 | Suzuki et al. ................ 382/135 |
| 5,659,342 A | | 8/1997 | Lund et al. .................... 347/35 |
| 5,678,863 A | | 10/1997 | Knight et al. ................ 283/113 |
| 5,693,693 A | * | 12/1997 | Auslander et al. ............ 524/88 |
| 5,734,802 A | * | 3/1998 | Maltz et al. ................... 358/1.9 |
| 5,781,658 A | * | 7/1998 | O'Gorman ................... 382/172 |
| 5,816,165 A | | 10/1998 | Huston ........................ 101/490 |
| 5,829,895 A | | 11/1998 | Hayashi et al. .......... 400/124.05 |
| 5,859,920 A | | 1/1999 | Daly et al. ................... 382/115 |
| 5,905,819 A | * | 5/1999 | Daly ........................... 382/284 |
| 5,929,415 A | | 7/1999 | Berson ........................ 235/382 |
| 6,007,182 A | * | 12/1999 | Matsubara et al. ............ 347/43 |

(Continued)

FOREIGN PATENT DOCUMENTS

EP  0863020 A2  3/1998

(Continued)

OTHER PUBLICATIONS

Output Hardcopy Devices, Chapter 13, by: W.J. Lloud and H.T. Taub, (Ed. R.C. Durbeck and S. Sherr, Academic Press, San Diego, 1988), pp. 350-352.

(Continued)

*Primary Examiner*—Kimberly Williams
*Assistant Examiner*—Michael Burleson
(74) *Attorney, Agent, or Firm*—Raymond A. Jenski

(57) ABSTRACT

A method of, and apparatus for, printing information on a hardcopy medium includes the acceptance of data representing a first information and the acceptance of data representing a second information. Second information is printed in regions on the medium where first information data is not printed. Second information data is encoded into a grayscale or color data representation such that necessary or maximum data density is achieved. First information is printed using black (K) ink (or alternatively using a different color gamut than that used for printing the second information) such that first information can be filtered out in a straightforward manner upon scanning of the printed medium by a digital scanning apparatus, and second information can then be recovered and utilized to advantage.

29 Claims, 23 Drawing Sheets

U.S. PATENT DOCUMENTS

| | | | | |
|---|---|---|---|---|
| 6,044,179 A | * | 3/2000 | Savakis | 382/270 |
| 6,106,110 A | * | 8/2000 | Gundjian et al. | 347/86 |
| 6,138,913 A | * | 10/2000 | Cyr et al. | 235/468 |
| 6,331,898 B1 | * | 12/2001 | Yokoi et al. | 358/1.9 |
| 6,354,692 B1 | * | 3/2002 | Ross | 347/41 |
| 6,373,965 B1 | * | 4/2002 | Liang | 382/112 |
| 6,437,881 B1 | * | 8/2002 | Baba et al. | 358/434 |
| 6,590,675 B1 | * | 7/2003 | Tomiyasu | 358/1.18 |
| 6,643,382 B1 | * | 11/2003 | Maeda | 382/100 |

FOREIGN PATENT DOCUMENTS

| | | |
|---|---|---|
| JP | 11088653 A | 3/1999 |

OTHER PUBLICATIONS

InfoImaging Technologies, Inc., Press Room [Online] Available: http://www.infoimaging.com/press/pr_flash.htm, Jan. 25, 2000.

InfoImaging Technologies, Inc., Management [Online] Available:http://www.infoimaging.com/corporate/pr_contc.htm, Jan. 25, 2000.

InfoImaging Technologies, Inc., Corporate [Online] Available at: http://www.infoimaging.com/corporate/pr_corp.htm, Jan. 25, 2000.

InfoImaging Technologies, Inc., FaxFile [Online] Available at: http://www.infoimaging.com/product/faxfile/config.htm, Jan. 25, 2000.

InfoImaging Technologies, Inc., FaxFile [Online] Available at: http://www.infoimaging.com/product/faxfile/whatneed.htm, Jan. 25, 2000.

InfoImaging Technologies, Inc., FaxFile [Online] Available at: http://www.infoimaging.com/product/faxfile/features.htm, Jan. 25, 2000.

InfoImaging Technologies, Inc., FaxFile [Online] Available at: http://www.infoimaging.com/product/faxfile/whatis3d.htm, Jan. 25, 2000.

InfoImaging Technologies, Inc., Technology [Online] Available at: http://www.infoimaging.com/corporate/pr_tech.htm, Jan. 25, 2000.

* cited by examiner

This is a line of text between data layer information.

This is a line of text between data layer information.

This is a line of text between data layer information.

This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz
This is a text block. This is a text block. This is a text block.
This is a text block. This is a text block. This is a text block.
0123456789abcdefghijklmnopqrstuvwxyzABCDEFGHIJKLM
NOPQRSTUVWXYZ0123456789abcdefghijklmnopqrstuvwxyz

PRINTED MEDIUM DATA STORAGE

BACKGROUND

The present invention generally relates to printing on a hardcopy medium and more particularly relates to placing data within or adjacent the text or graphic printed on a hardcopy medium.

Inkjet printing is usually considered to be a technique of directing small discrete quanta of ink from a reservoir to a sheet or medium such as paper, transparency film, and the like to produce perceptible alphanumeric, graphic, and pictorial images on the medium. The energy needed to move the quanta of ink (ink drops, usually) can come from thermal, piezoelectric, electrostatic, acoustic, electromagnetic, and similar energy sources. The basics of inkjet printing technologies can be found in *Output Hardcopy Devices*, W. J. Lloyd and H. T. Taub (edited by R. C. Durbeck and S. Sherr), Academic Press, San Diego, 1988, chapter 13. The ink drops are deposited on the printed medium as dots of ink colorant from which the liquid ink vehicle quickly evaporates. For text, ink dots are deposited in an arrangement that produces a full colorant (usually black) presence where a character is to be printed and an absence of colorant in the spaces within and between the characters. Roughness of the edges of the printed character due to the quantum nature of each ink drop can be mitigated by careful selection of the placement of each drop at the character edge (as well as other optimizations of ink chemistry, media, and the like).

For gray scale printing and color image printing, the concept of printing in superpixels has come into being to enable gradations of intensity and hue to be realized. A superpixel is generally recognized to be a coordination of an area (the superpixel) of the printed medium, usually a theoretical square that is subdivided into smaller square areas. Into each of the smaller areas (referred to as pixels) a dot can be placed, or left unplaced, depending upon the level of gray scale or the color to be realized for the superpixel. See, for example, U.S. Pat. No. 4,930,018. Moreover, to avoid undesirable artifacts (Moiré patterns, "worms", etc.) of printing using discrete quanta (dots), dithering and error diffusion calculations are made and the dots are distributed among the superpixels to reduce the artifacts in accordance with the calculations. See, for example, U.S. Pat. No. 5,031,050.

Generally without regard to the method of printing, others have begun to employ techniques of embedding information (data) into a printed image. In U.S. Pat. No. 5,905,819 the art of steganography was identified as a precursor to the more recent desire to hide a digital message within a printed image. Digital steganography was interpreted, there, as encompassing techniques of tamper-proofing (providing the ability to determine whether a digital image has been manipulated or modified from an original), digital watermarking (providing the ability to establish ownership and copyright infringement), image tagging (adding a unique identifier to each image copy to identify the individual creating bootleg copies), digital pointers (providing, for example, an invisible internet address for additional information), and data augmentation (providing, in a form relatively undetectable by human perception, additional information regarding the image in which the data is hiding). This patent discloses a complex method of combining the desired image and the data in a manner which disturbs the desired image very little. This disclosed method, however, suffers from the drawback that the original image must be known for the data to be recovered from the combined copy. Also see, for example, U.S. Pat. No. 5,859,920.

Hidden information in a visible image has also found usage in postal franking applications. In one instance, described in U.S. Pat. No. 5,829,895 where a two-pass dot matrix printing method is used to place a postal indicia on an envelope, one of the passes places a message in the printed postal indicia by adjusting the dot matrix dot density to create a lightly populated dot density, thereby enabling the message to be readable due to the low population of dots. The second printing pass places a higher dot density in the previously low dot population density area in order to obliterate the message. Postal franking fraud can thereby be avoided.

Other techniques of preventing postal fraud include the use of fluorescing (or phosphorescing) ink, which is invisible in the human-perceptible light spectrum, to be printed in a print layer over a visibly perceptible print layer. Thus, a bar code printed over the visible print (such as that described in U.S. Pat. No. 5,693,693) can contain more, and relatively secure, information than that available in a conventional bar code.

In a separate technological direction, InfoImaging Technologies, Inc. is presently marketing a product called 3D FaxFile. This product converts documents (text, color images, etc.) into a digital black and white pattern that can be transmitted via a standard fax machine. At the receiving end, the faxed document can be scanned or otherwise reconverted into a digital data stream that is subsequently recomposed into a copy of the original document. Coding and data compression can yield a secure and significantly smaller document to be faxed than the original. And, a color document can be transmitted by an otherwise colorless transmission technology.

The foregoing notwithstanding, there exists a need to provide a technique of adding information to or storing information on a printed medium. The use of color offers an expanded capability for higher information density than simple black and white printing. Moreover, if two or more blocks of information, which can be unrelated, are to be printed on the medium it is desirable that the information not interfere with each other and that each be independently recoverable from the printed medium.

SUMMARY

Printing information on a medium includes the acceptance of data representing a first information and the acceptance of data representing a second information. The second information adds informational value over the first information. Marks of a first color are deposited in accordance with the first data and marks of a second color are deposited in accordance with the second data. In this way, the first information and the second information are printed on the medium and are detectable as separate first information and second information from the printed medium.

BRIEF DESCRIPTION OF THE DRAWINGS

The file of this patent contains at least one drawing executed in color. Copies of this patent with color drawings will be provided by the Patent and Trademark Office upon request and payment of necessary fee.

FIG. 23 is a printed page illustrating a printed output on a hardcopy medium, which may be produced in accordance with an alternative embodiment of the present invention.

FIG. 26 is a printed hardcopy output that illustrates a complete output page containing a grayscale gradient and bounding boxes to permit calibration and alignment of the scanning process.

DETAILED DESCRIPTION OF THE PREFERRED EMBODIMENTS

The present invention advantageously uses the multi-color dot deposition capability of color printing devices to place multiple channels or data sources of information on a printed medium by encoding each channel or data source in a different range of ink colors onto the printed medium. Although the preferred embodiment describes the use of an inkjet printer to place color marks in the form of ink dots on a recording medium, other printing devices such as laser printers, which also place color marks on a recording medium, may also profit from the present invention. The range of colors can be a single identifiable color such as black or cyan, a color gamut that can be separable into digitally encodable colors (for example $2^{24}$ combinations of yellow, cyan, and magenta inks, commonly known in inkjet printing), shades of gray (commonly referred to in printing as grayscale), or colors that are imperceptible to humans (such as those having reflectance or absorbtion in infrared or ultraviolet).

Figure 1:
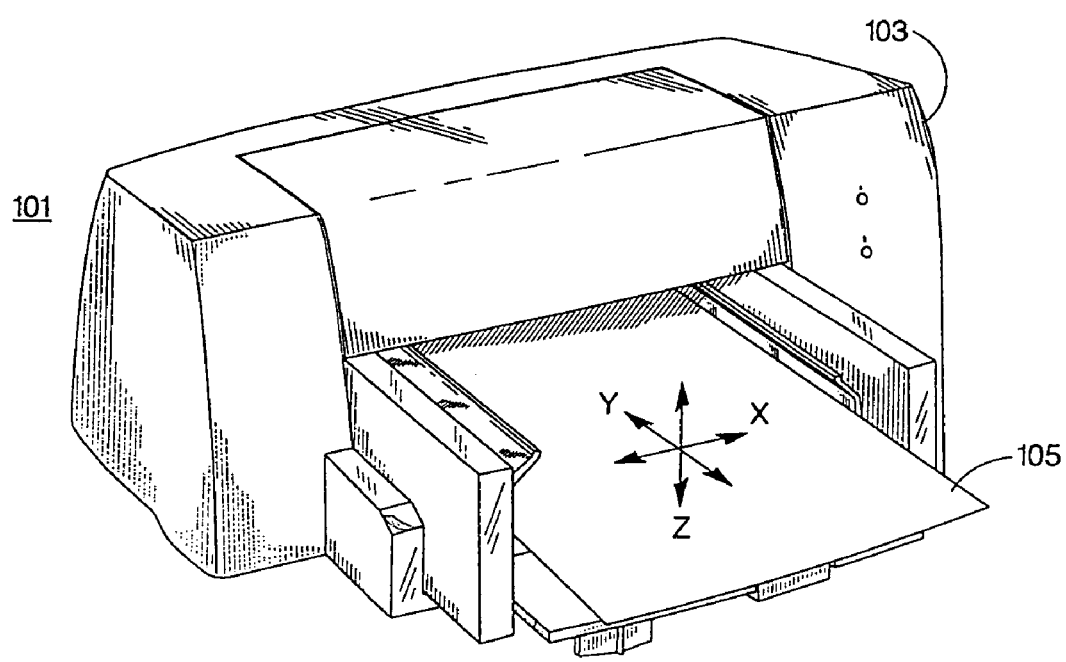
FIG. 1 is an isometric drawing of a printing apparatus, which may employ the present invention.
Figure 2:
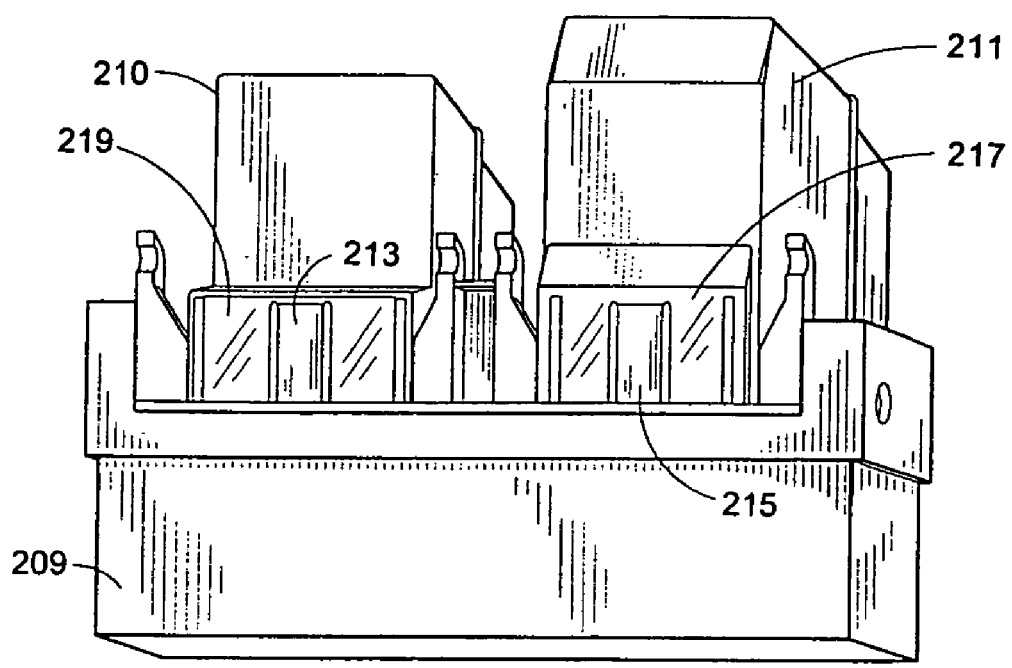
FIG. 2 is an isometric drawing of an inkjet printer carriage mounting two inkjet print cartridges such as may be utilized in the printing apparatus of FIG. 1.

An exemplary inkjet printing apparatus, a printer 101 that may employ the present invention, is shown in outline form in the isometric drawing of FIG. 1. Printing devices such as graphics plotters, copiers, and facsimile machines may also profitably employ the present invention. A printer housing 103 contains a printing platen to which an input print medium 105, such as paper, is transported by mechanisms that are known in the art. Other forms of media can be overhead transparency material or fabric. A carriage 209 within the printer holds one or a set of individual print cartridges capable of ejecting ink drops of black or color ink. Alternative embodiments can include a semi-permanent printhead mechanism that is sporadically replenished from one or more fluidically-coupled off-axis ink reservoirs, or a single print cartridge having two or more colors of ink available within the print cartridge and ink ejecting nozzles designated for each color, or a single color print cartridge or print mechanism; the present invention can be satisfactorily employed by at least these alternatives. The carriage 209, which may be employed in the printer 101, mounts two print cartridges 210 and 211, as illustrated in FIG. 2. The carriage 209 is typically supported by a slide bar or similar mechanism within the printer and physically propelled along the slide bar to allow the carriage 209 to be translationally reciprocated or scanned back and forth across the print medium 105. The scan axis, X, is indicated by an arrow in FIG. 1. As the carriage 209 scans across the medium, ink drops are selectively ejected from drop generators disposed within the printheads of the set of print cartridges 210 and 211 onto the medium 105 in predetermined print swath patterns, forming images or alphanumeric characters using dot matrix manipulation. Generally, the dot matrix manipulation is determined by a user's computer (not shown) and instructions are transmitted to a microprocessor-based, electronic controller within the printer 101. Other techniques employ a rasterization of the data in a user's computer prior to the rasterized data being sent, along with printer control commands, to the printer. This operation is under control of printer driver software resident in the user's computer. The printer interprets the commands and rasterized data to determine which drop generators to fire. The ink drop trajectory axis, Z, directed from the print cartridge toward the medium is indicated by an arrow. When a swath of print has been completed, the medium 105 is moved an appropriate distance along the print media axis, Y, indicated by the arrow, in preparation for the printing of the next swath. This invention is also applicable to inkjet printers employing alternative means of imparting relative motion between printhead and media, such as those that have fixed printheads (such as page wide arrays) and move the media in one or more directions, those that have fixed media and move the printhead in one or more directions (such as flatbed plotters). In addition, this invention is applicable to a variety of printing systems, including large format devices, copiers, fax machines, photo printers, and the like.

The inkjet carriage 209 and print cartridges 210, 211 are shown from the −Z direction within the printer 101 in FIG. 2. The printheads 213, 215 of each cartridge may be observed when the print cartridges are viewed from this direction. In a preferred embodiment, ink is stored in the body portion of each printhead 210, 211 and routed through internal passageways to the respective printhead. In an embodiment of the present invention which is adapted for multi-color printing, three groupings of orifices, one for each color (cyan, magenta, and yellow), are arranged on the foraminous orifice plate surface of the printhead 215. Ink is selectively expelled for each color under control of commands from the printer that are communicated to the printhead 215 through electrical connections and associated conductive traces (not shown) on a flexible polymer tape. In the preferred embodiment, the tape is typically bent around an edge of the print cartridge and secured. In a similar manner, a single color ink, black, is stored in the ink-containing portion of cartridge 210 and routed to a single grouping of orifices in printhead 213. Control signals are coupled to the printhead from the printer on conductive traces disposed on a polymer tape. In other applications not shown, additional ink cartridges having additional colors may be mounted on the carriage 209. For special purposes, ink that is colorless in visible light but that is absorptive, fluorescent, or phosphorescent in the infrared or ultraviolet may also be used.

Figure 3:
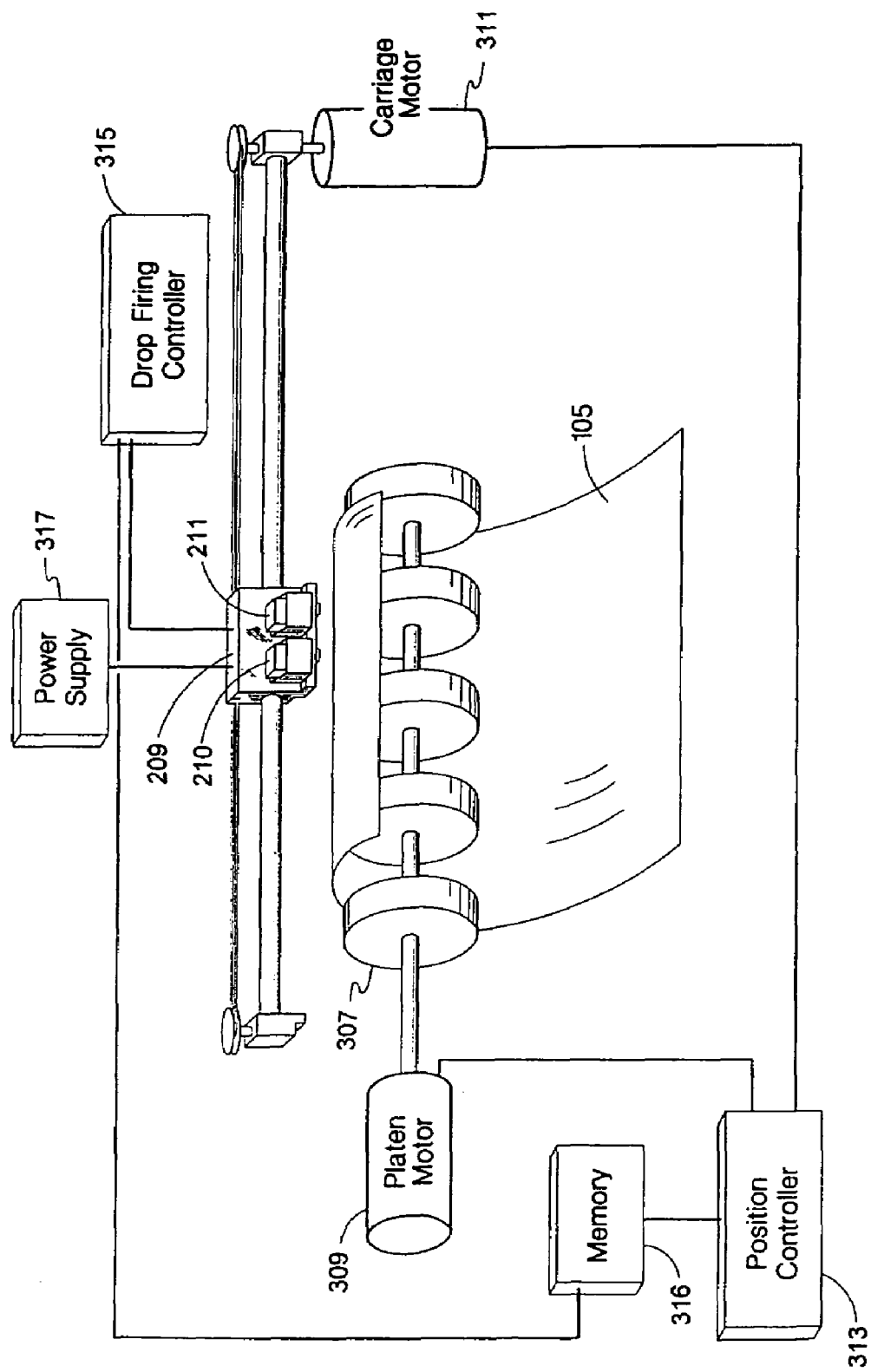
FIG. 3 is a block diagram of the essential parts of a printing apparatus such as that of FIG. 1.

As can be appreciated from a preferred embodiment shown in FIG. 3, a single medium sheet is advanced from an input tray into a printer print area beneath the printheads by a medium advancing mechanism including a roller 307, a platen motor 309, and traction devices (not shown). In a preferred embodiment, the inkjet print cartridges 210, 211 are incrementally drawn across the medium 105 on the platen by a carriage motor 311 in the ±X direction, perpendicular to the Y direction of entry of the medium. The platen motor 309 and the carriage motor 311 are typically under the control of a media and cartridge position controller 313. An example of such positioning and control apparatus may be found described in U.S. Pat. No. 5,070,410. Thus, the medium 105 is positioned in a location so that the print cartridges 210 and 211 may eject drops of ink to place dots on the medium as required by the data that is input to a drop firing controller of the printer. These dots of ink are formed from the ink drops expelled from selected orifices in the printhead in a band parallel to the scan direction as the print cartridges 210 and 211 are translated across the medium by the carriage motor 311. When the print cartridges 210 and 211 reach the end of their travel at an end of a print swath on the medium 105, the medium is conventionally incrementally advanced by the position controller 313 and the platen motor 309. Once the print cartridges have reached the end of their traverse in the X direction on the slide bar, they are either returned back along the support mechanism while continuing to print or returned without printing. The medium may be advanced by an incremental amount equivalent to the width of the ink-ejecting portion of the printhead or some fraction thereof related to the spacing between the nozzles.

Control of the medium, positioning of the print cartridge, and selection of the correct ink ejectors for creation of an ink image or character is determined by the position controller 313 and drop firing controller 315. The controllers may be implemented in a conventional electronic hardware configuration and provided operating instructions from conventional memory 316. Once printing of the medium is complete, the medium is ejected into an output tray of the printer for user removal.

Figure 4:
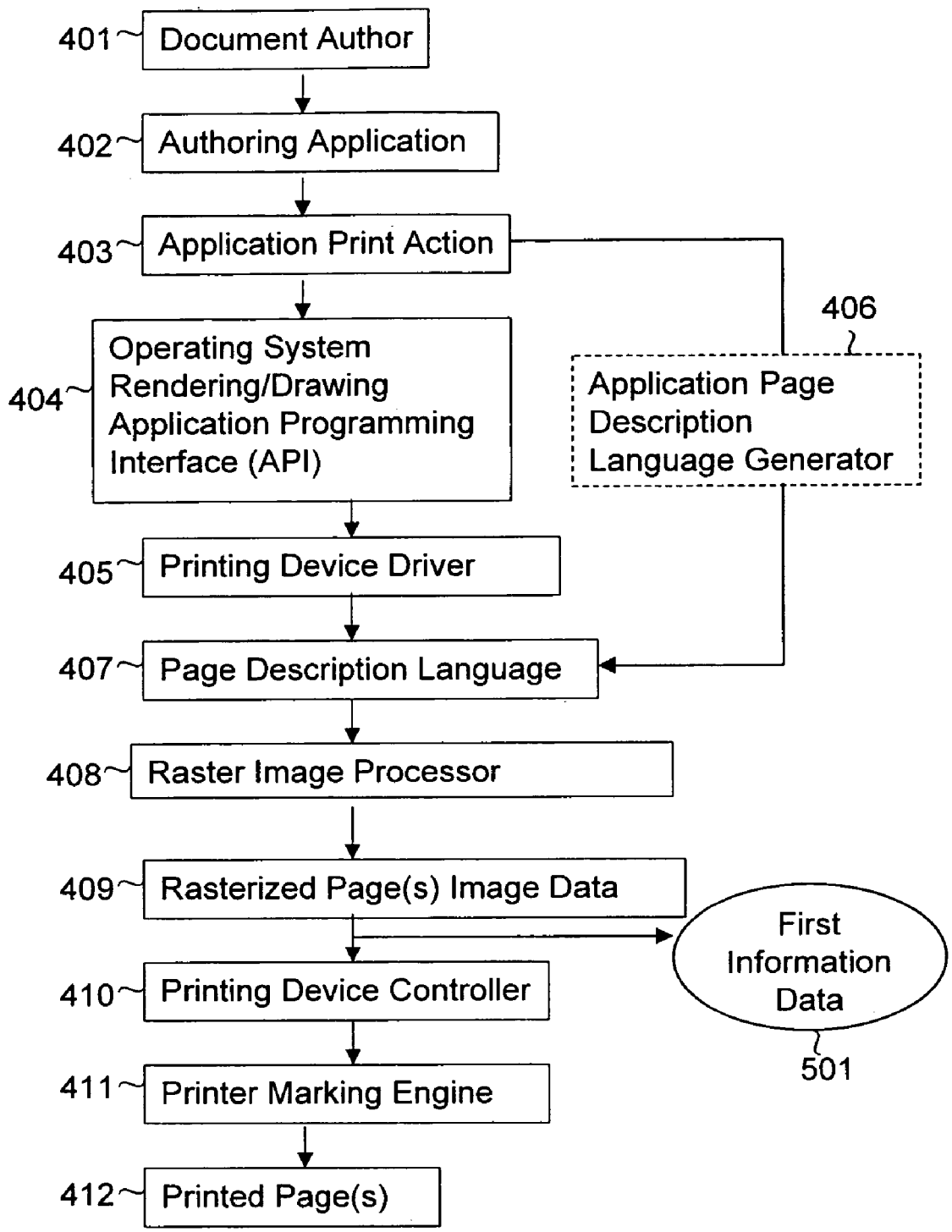
FIG. 4 is a flowchart of a document printing process as may be used for the printing apparatus of FIG. 1.

A generalized flowchart of a document printing process that controls the printer in accordance with the present invention is shown in FIG. 4. Utilizing a computer system, a document author 401 creates a document using an authoring application 402 such as Microsoft Word or Quark Xpress. The author initiates a print of the document by invoking the application's print action 403. The application code converts the digital representation of the document into drawing application programming interface function calls 404, such as Microsoft Graphics Device Interface (GDI), as can be recognized by the computer operating system. The drawing application interface function calls are sent to the printing device driver 405. The printing device driver 405 converts the operating system drawing interface function calls into a page description language, e.g. Adobe PostScript or Hewlett-Packard Printer Control Language, 407, as can be understood by the printing device. Note that some application programs can generate page description language directly in which case alternate process path 406 would be used. A raster image processor 408, generally in the printing device, but which may also be implemented within the printer device driver software in low-cost systems, converts the digital document representation into a rasterized form whereby each page of the document is represented by a separate digital raster image data, 409. The rasterized page image data 409 is then processed by the printer device controller 410 as may consist of printer memory 313, drop firing controller 315, and position controller 313 as illustrated in FIG. 3. The printing device controller instructs the printer marking engine 411 as may consist of ink cartridges 210, 211 previously described, to eject ink drops in accordance with the information input to the authoring application, to produce final printed document pages 412.

Figure 5:
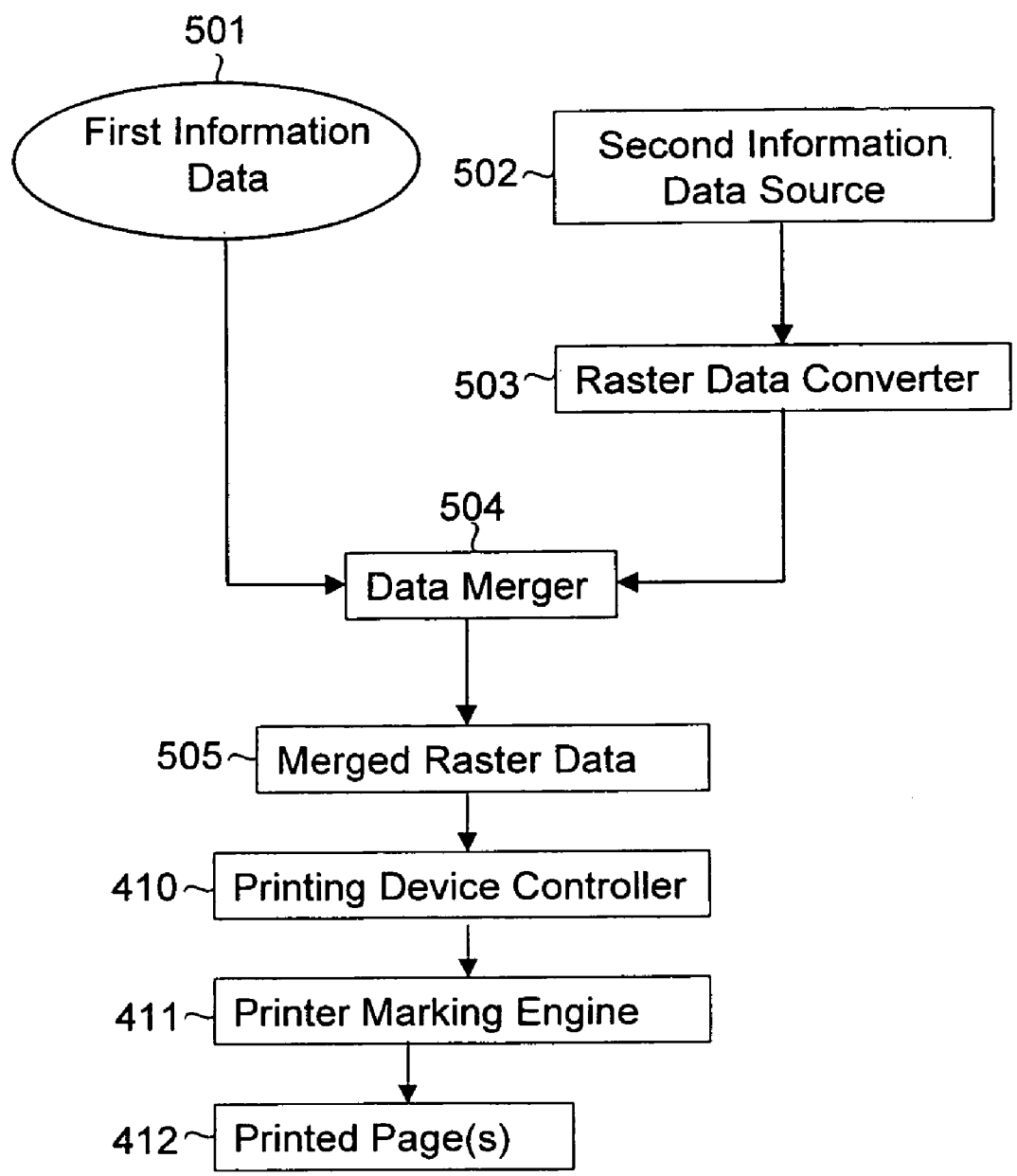
FIG. 5 is a flowchart illustrating a method, which may be employed in the present invention, to merge second information data with first information data prior to printing.

FIG. 5 illustrates the enhanced printing process, which may be employed in the present invention. This process assumes a first information data source 501 representing "black" textual information to be printed. A second information data source 502 originating from another application is introduced. The second information data source is converted by raster data converter 503 into raster pixel data values. These data values are uniquely assigned such that the pixel value for "black" ink is not used. The second information raster data is then merged with the first information raster image data by a data merger process 504, which will be described subsequently, to produce final merged raster data 505. The final merged raster data is then sent to the printing device controller 410 and the printing process continues as previously described to eject ink drops in accordance with the first information data and the second information data at the appropriate positioning of the print cartridges 210, 211 relative to the medium 105 to produce printed pages 412 containing both the first and second information. It is a feature of the present invention that the first information and the second information are printed on the medium in such a way that the colors (i.e. the ink drops) of the first information are placed such that they accommodate and do not interfere with the colors of the second information. Further, the colors of the second information are placed such that they accommodate and do not interfere with the colors of the first information. Considered another way, the first information is deposited on the medium as a pattern of marks and the second information is deposited as a sequence of color marks in raster format, which when scanned by a scanning apparatus, recovers the data of the second information. Examples of this feature can be found in the figures accompanying this disclosure.

Figure 6:
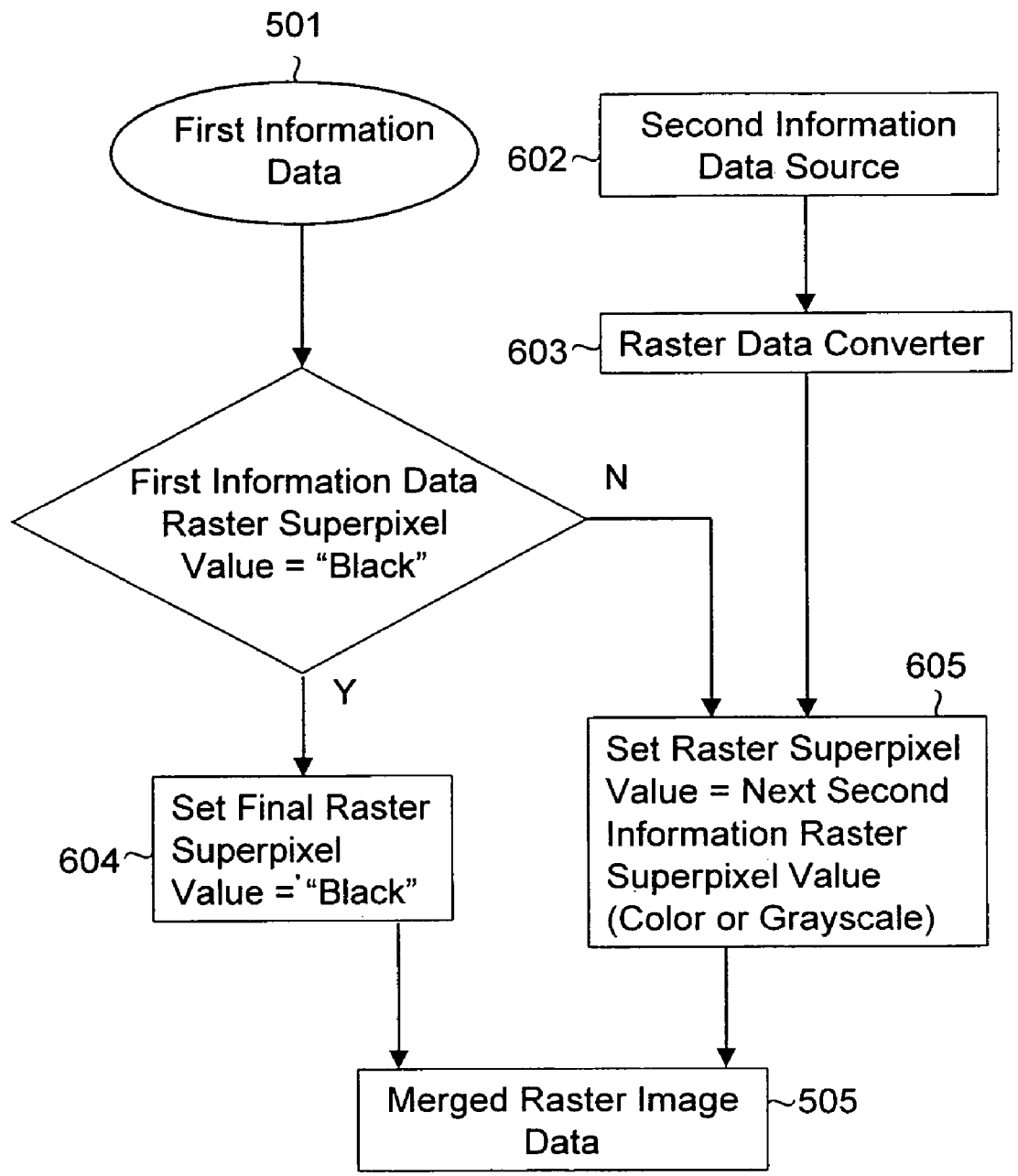
FIG. 6 is a flowchart that illustrates the raster data merge process of FIG. 5.

FIG. 6 illustrates the merge raster image data process in more detail. In this process, each superpixel value from the first information raster data is evaluated to determine if a visible "Black" mark is to be made on the printed page. If so, the superpixel value in the final raster image data is set in 604 to "Black". Otherwise the final raster image data value is set in 605 to the value of the next superpixel in the second information raster data. Thus a final raster image is generated containing merged first and second information. In a preferred embodiment of the present invention, the scale of printed data is established as a superpixel. The scope of the present invention need not be so limited, as areas larger than a superpixel may be employed to convey information on a printed medium. Likewise, areas as small as a pixel may be employed to convey information.

Figure 7:
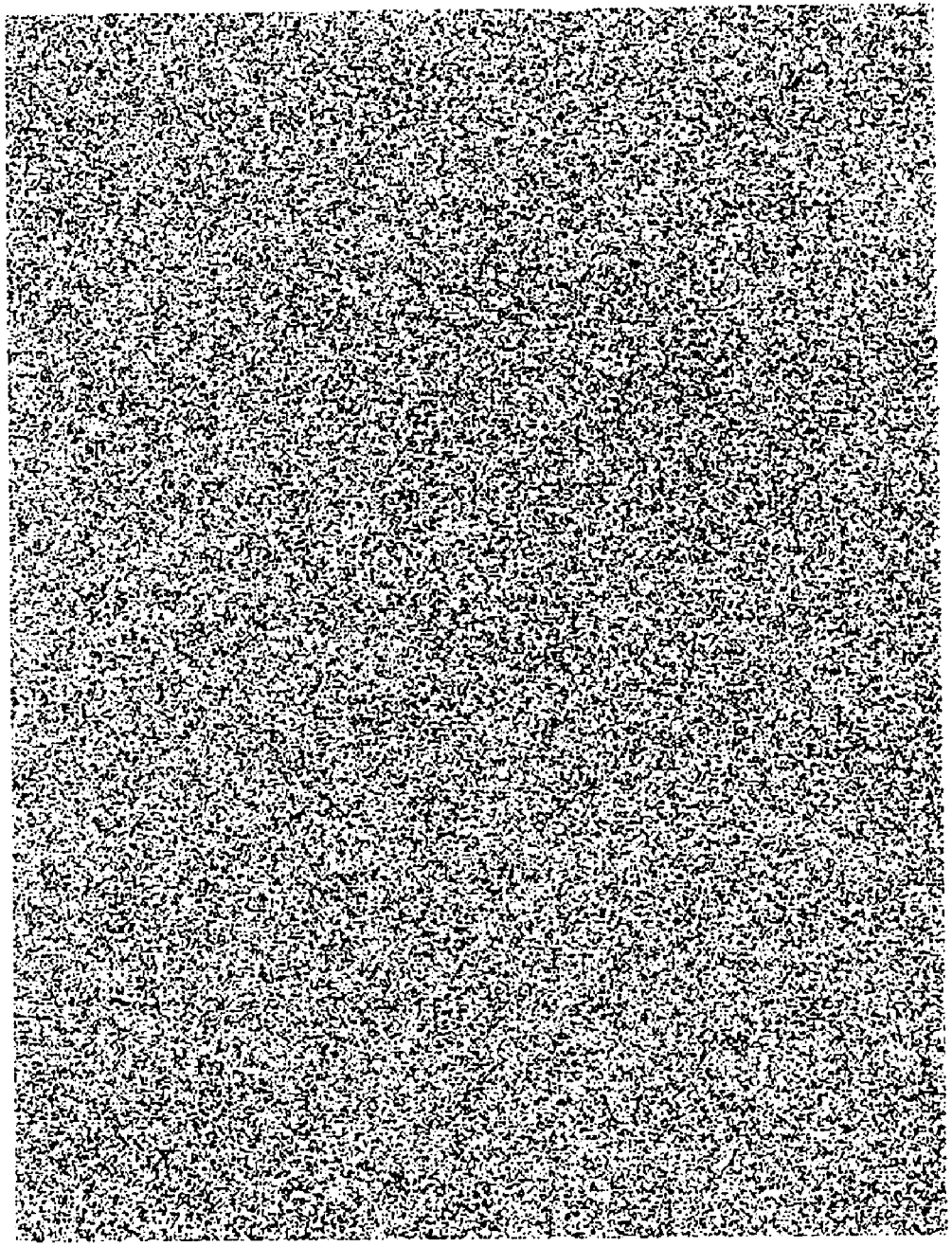
FIG. 7 is a printed example of second information data that has been rasterized and may be employed according to the present invention.
Figure 8:
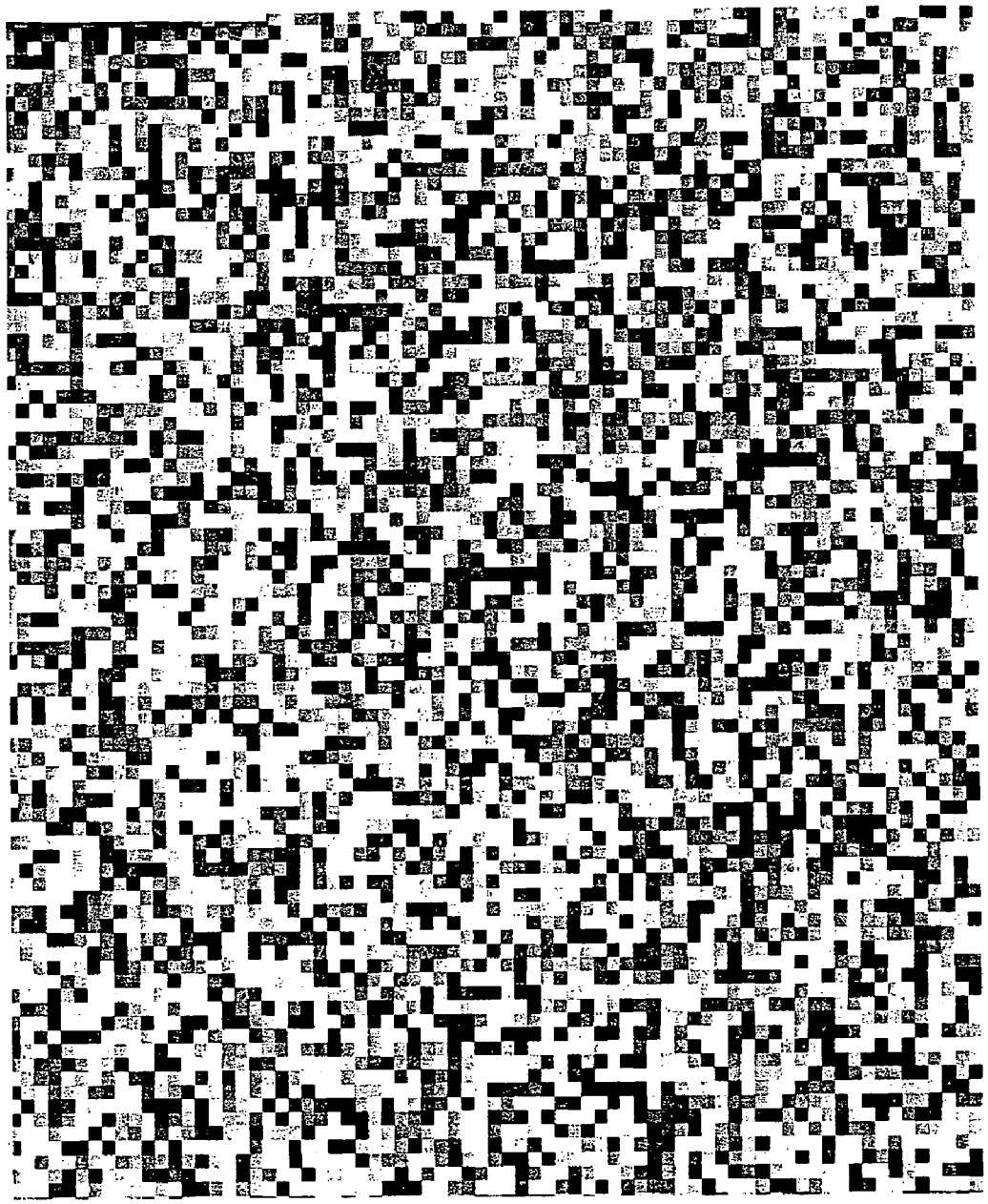
FIG. 8 is a printed magnification of an area of FIG. 7.
Figure 9:
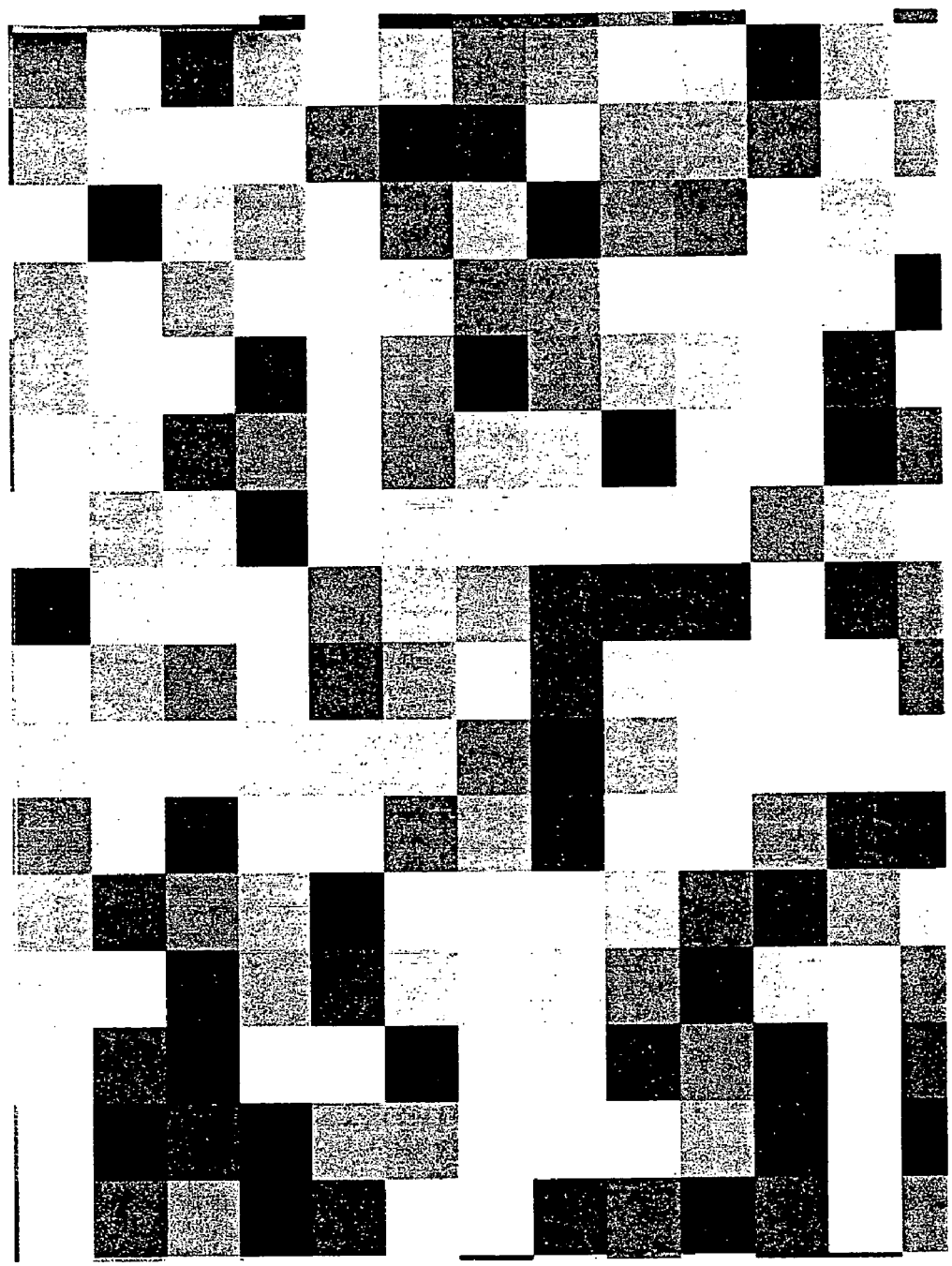
FIG. 9 is a printed magnification of an area of FIG. 8.

Several examples which illustrate output onto printed medium from a system employing the present invention follow. The features and advantages can best be perceived in the color renditions of the figures. In FIG. 7, an example of secondary information, rasterized into color superpixels and printed by a color inkjet printer such as an HP970Cxi, available from Hewlett-Packard Company, is shown. Since a great amount of information can be placed in the printed area of a standard sized sheet of media (several megabytes), the secondary information can effectively store data such as pictures, text, graphics, and the like—information that may or may not be related to the primary information being printed. FIGS. 8 and 9 illustrate magnified views of the secondary information printed in FIG. 7 and further show a possible range of color gamut that can be applied to a printed medium for storage of secondary information.

Figure 10:
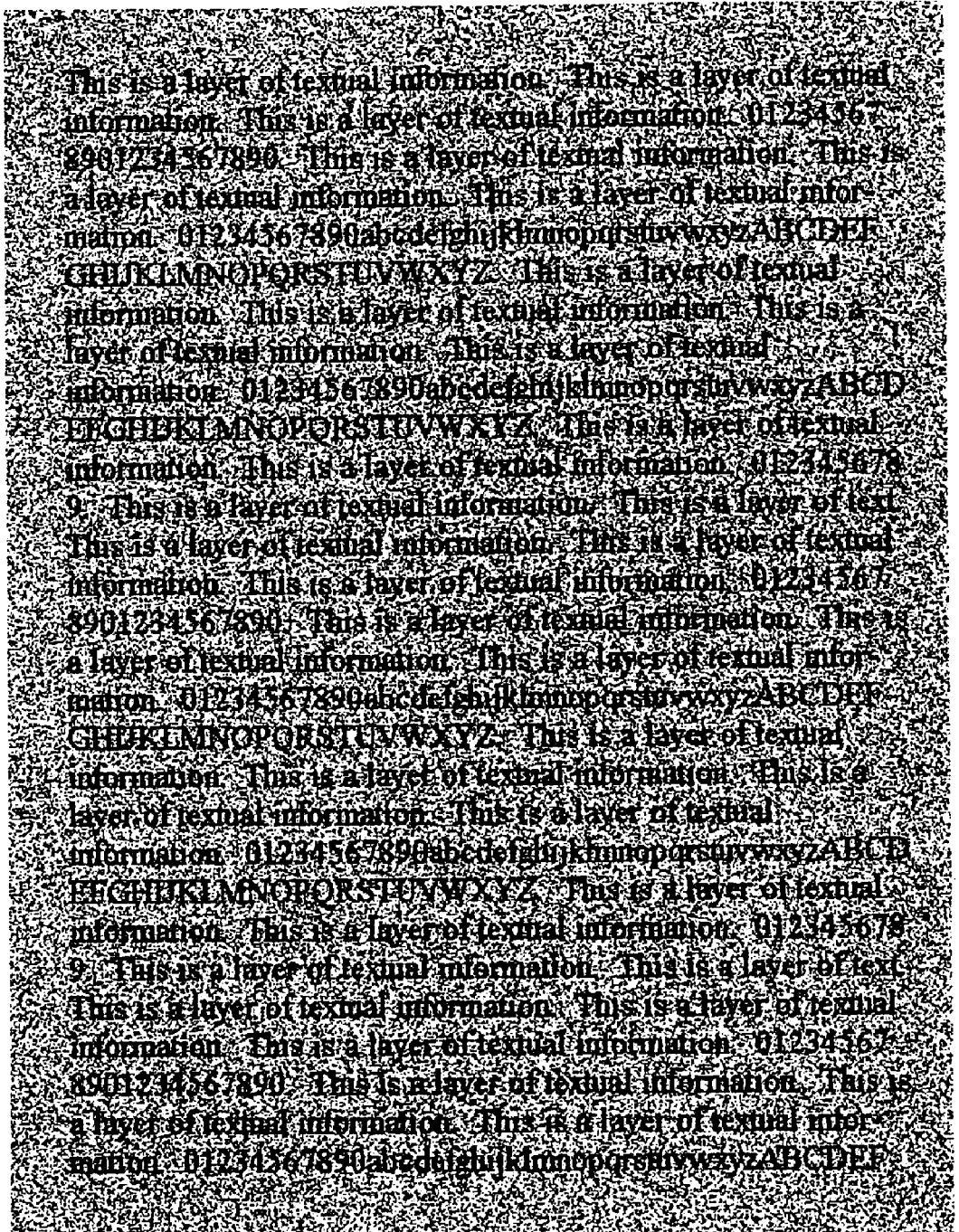
FIG. 10 is a printed merged raster data combining the raster data of a first information black text with that of a second information data, which has been converted to color rasterized data in accordance with the present invention.
Figure 11:
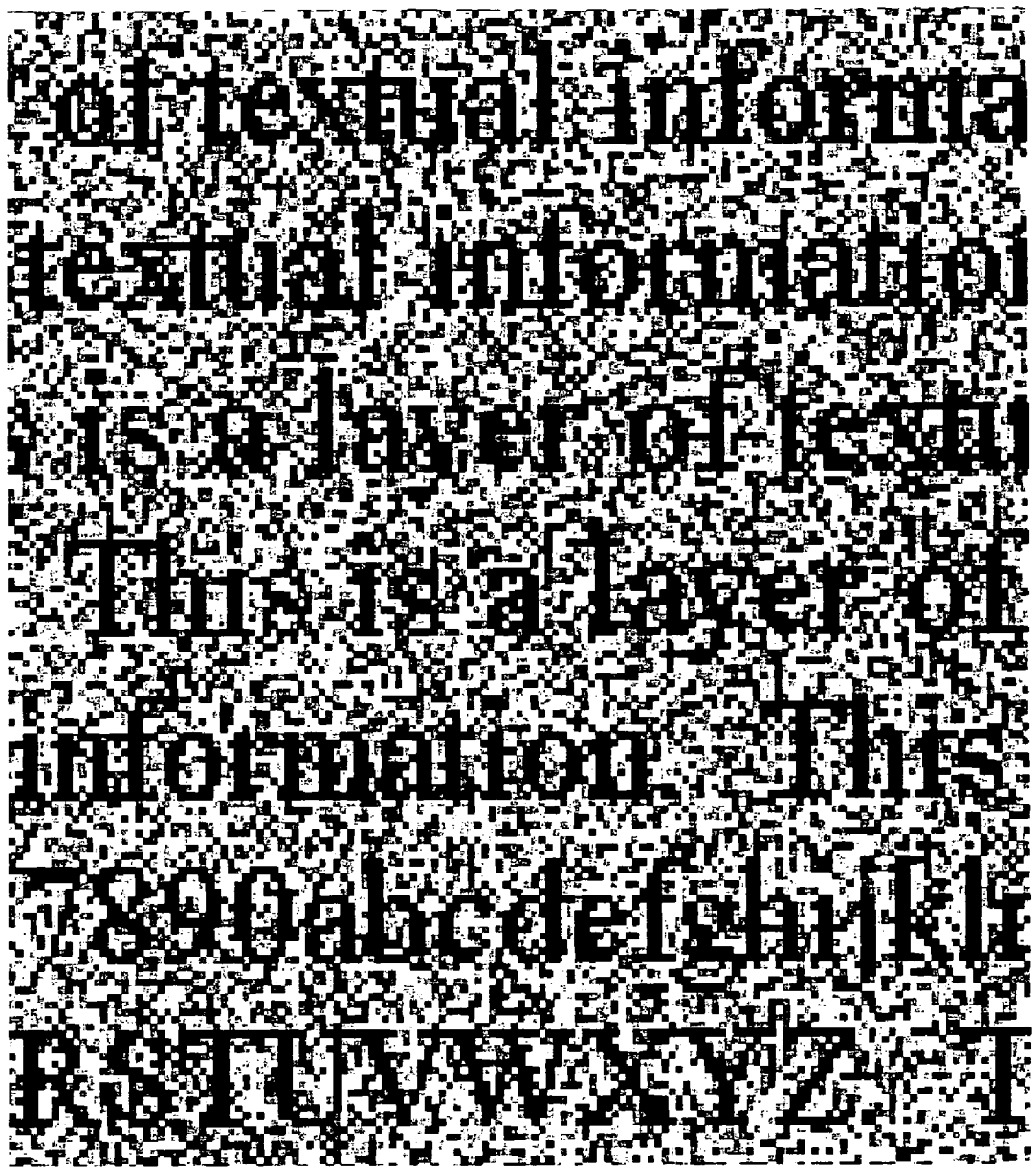
FIG. 11 is a printed magnification of an area of FIG. 10.

FIG. 10 is a printed page illustrating the output of a merged raster data combining the raster data of a first information, originally input as conventional text data, and the raster data of a second information, originally input as conventional picture, graphics, text, or the like data. The printed output, then, is a background of color superpixels and a foreground of black text, thereby providing first and second data independently detectable from the printed medium. As shown, the secondary background is printed with a high color intensity. Lower color intensity can be used to enhance the visibility of the first information black text but with a reduced signal to noise for the secondary information signal. FIG. 11 is a printed illustration of a magnified portion of FIG. 10.

Figure 12:
FIG. 12 is a printed magnification of a portion of one printed raster line of FIG. 10.
Figure 13:
FIG. 13 is a printed magnification of a portion of two printed raster lines of FIG. 10 with the black text (first data) information removed.
Figure 14:
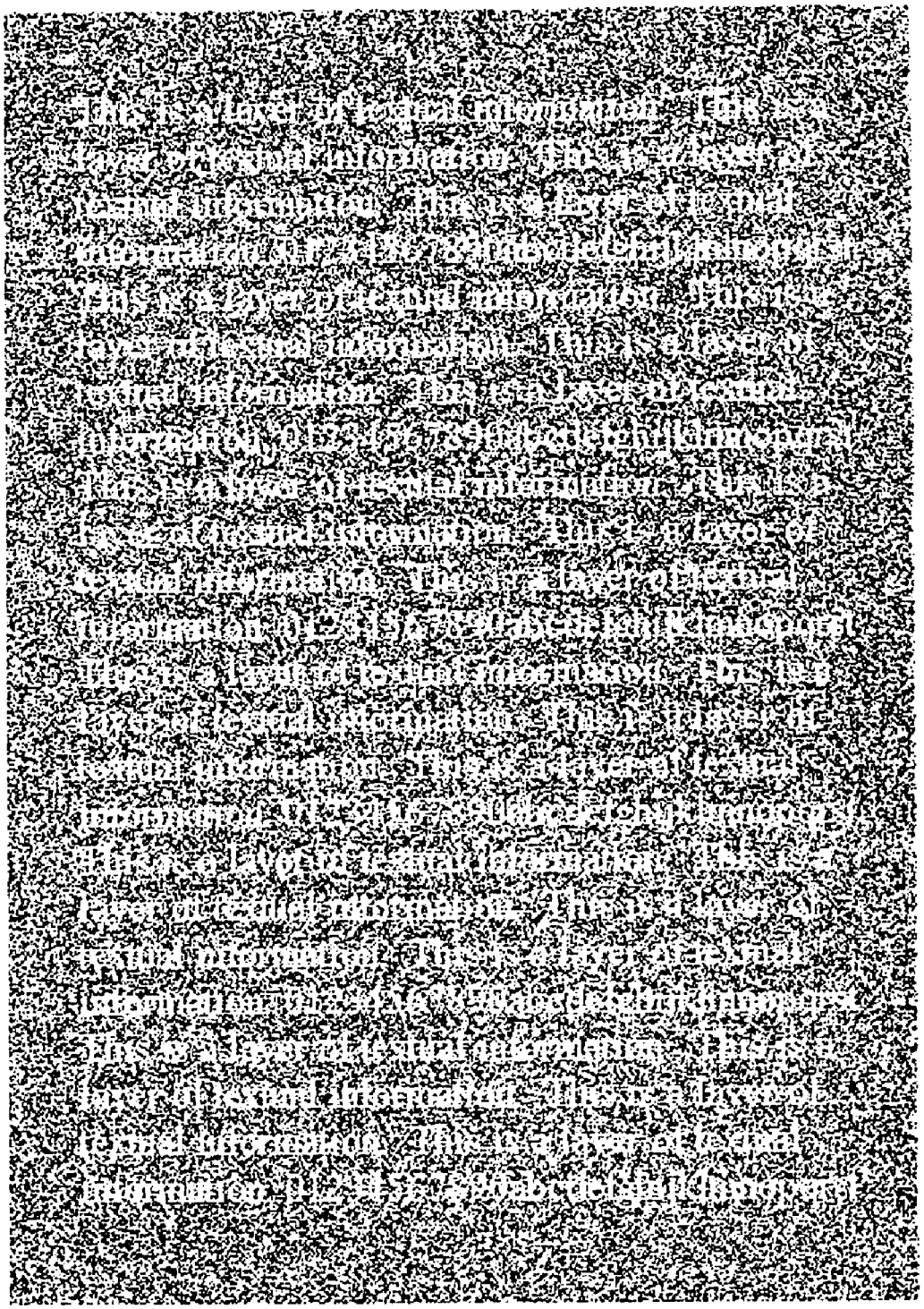
FIG. 14 is a printed complete page from which first information black text data has been removed, leaving only rasterized second information data.
Figure 15:
FIG. 15 is a printed magnification of an area of FIG. 14.

Recovery of the secondary information can be apprehended by viewing FIGS. 12 and 13. FIG. 12 is a printed portion of one raster line of FIG. 10. A scanning apparatus having a sufficient resolution will easily detect the color gamut of each superpixel as a scan that follows the raster line occurs. By eliminating true black from the color gamut of the scanning apparatus, the two raster line portions of FIG. 13 are detected by the scanning apparatus. From the detection of the specific color of each superpixel, the secondary data is recovered from the stream of superpixels detected in the raster line scan. For completeness of understanding, the printed illustrations of FIGS. 14 and 15 show the printed secondary data of the medium minus the black text information and a magnified view thereof (FIG. 15).

Figure 16:
FIG. 16 is a printed merged raster data combining the raster data of a first information data black graphic image with that of a second information data, which has been converted to color rasterized data in accordance with the present invention.
Figure 17:
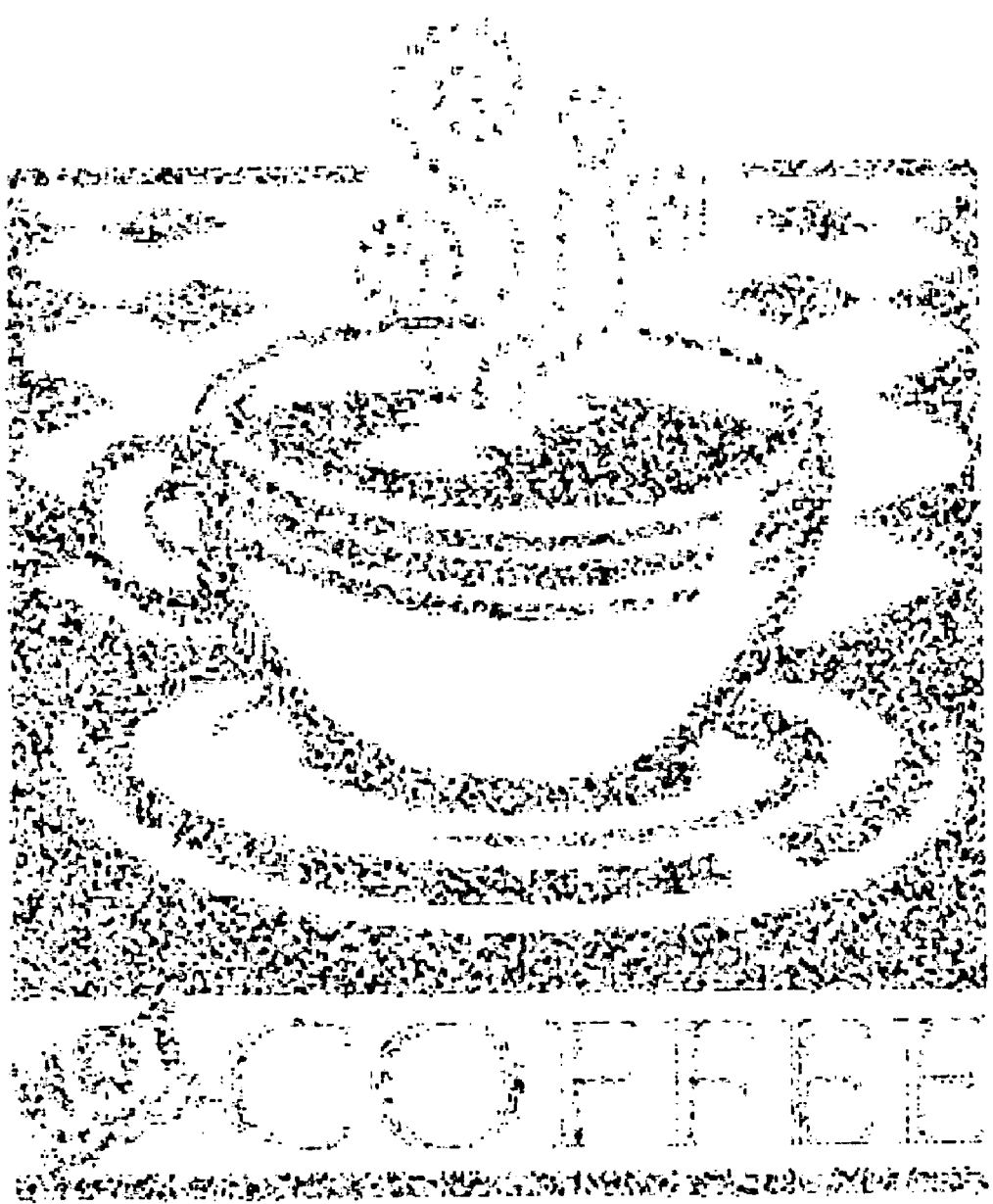
FIG. 17 is a printed version of FIG. 16 with first information data black graphic image removed.
Figure 18:
FIG. 18 is a printed magnification of a portion of FIG. 17.

The first data need not be limited to textual data. FIG. 16 illustrates a first information graphic image (printed in true black) with a background of color superpixels encoding second information. The printed second information is shown with the first information removed in FIG. 17 and a magnified view of FIG. 17 is shown in FIG. 18.

Figure 19:
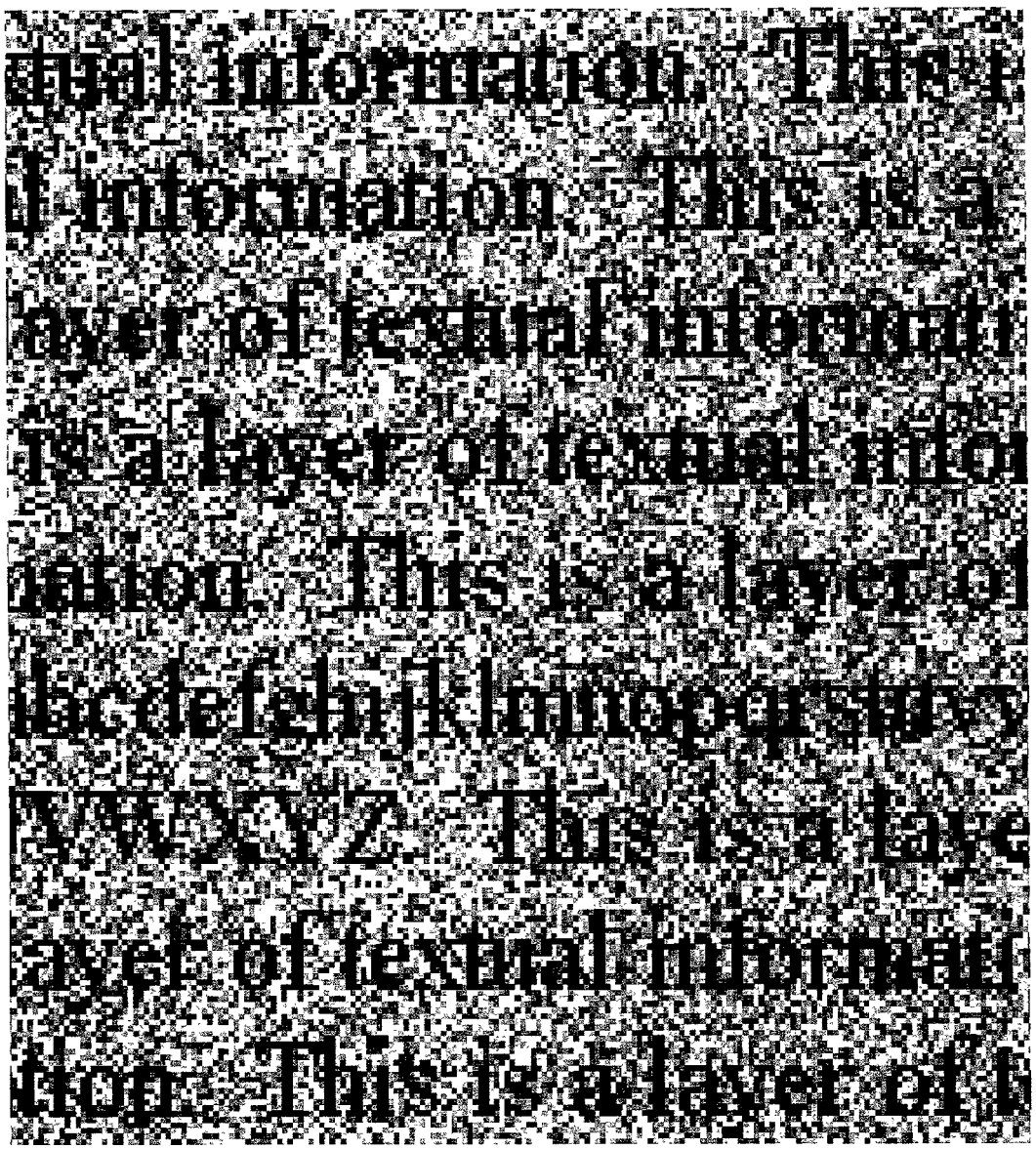
FIG. 19 is a printed merged raster data combining the raster data of a first information black text with that of a second information data, which has been converted to grayscale raster data in accordance with the present invention.
Figure 20:
FIG. 20 is a printed magnification of a portion of one printed raster line of FIG. 18.
Figure 21:
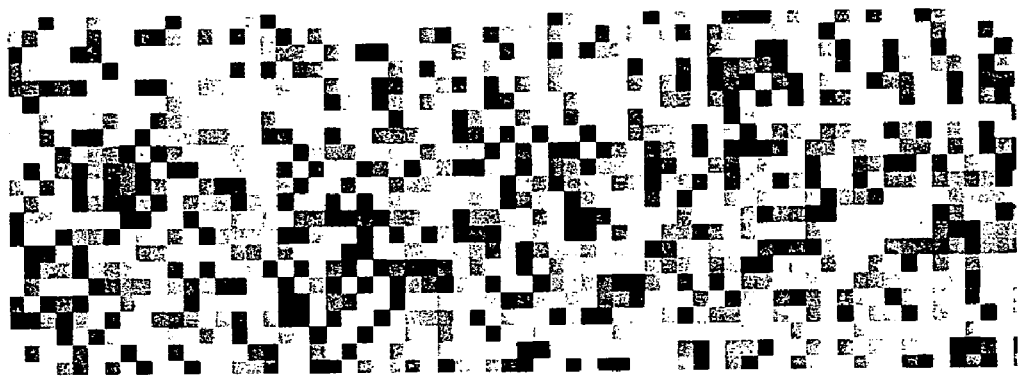
FIG. 21 is a printed magnification of an area of FIG. 18 with the black text (first data) information removed.

The output from a first alternative embodiment of the present invention is shown in FIG. 19, in which "color" is taken to mean shades of gray. In this embodiment, first information is originally input as conventional text data, and the raster data of a second information, originally input as conventional picture, graphics, text, or the like data. The printed output, then, is a background of superpixels having varying shades of gray in accordance with a predetermined printer gray scale and a foreground of black text. Thus, first and second data is printed on a medium independently detectable when viewed from the printed medium. Of course, second information density is diminished from color encoding when a gray scale encoding is used. FIG. 20 shows a single raster line from the gray scale printing of FIG. 19 and FIG. 21 shows a plurality of raster lines from the printed output of FIG. 19 but with the true black information removed.

Figures 22, 24:
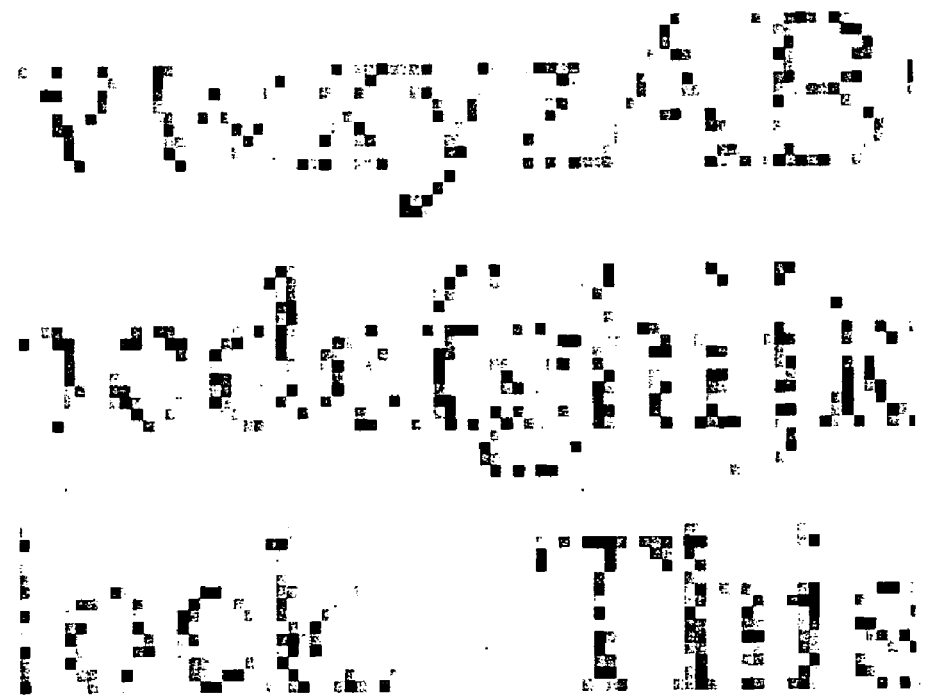
FIG. 22 is a printed merged raster data combining data of a first information data text with that of a second information data which has been converted to color rasterized data in accordance with an alternative embodiment of the present invention.
FIG. 24 is a printed merged raster data combining the raster data of a first information data black text with that of a second information data, which has been converted to color rasterized data in accordance with an alternative embodiment of the present invention and in which second information rasterized data is printed in constrained regions of the page not containing first information raster data.

FIG. 22 is an enlarged printed output illustrating the result from a second alternative embodiment of the present invention. In this embodiment, the secondary information is rasterized and combined with the first information and is, in fact, a fully integrated component of the first information. Specifically, the text information of the first information is comprised of the second information. The normal size printed output is shown in FIG. 23. It should be observed that when the scanning apparatus scans the raster lines of this second alternative embodiment, there is no first information to be removed. White space is ignored. If low second information is acceptable, the second information can be printed as preselected parts of the first information, for example only in text period characters.

The printed output resulting from a third alternative embodiment is shown in FIG. 24. In this instance, the second information, encoded as raster lines of color superpixels, is placed on the printed medium in positions where the first information is not printed. This second information positioning can be in predetermined locations such as interlineations or marginalia, or it can be placed where unpredictable first information is not placed.

Figure 25:
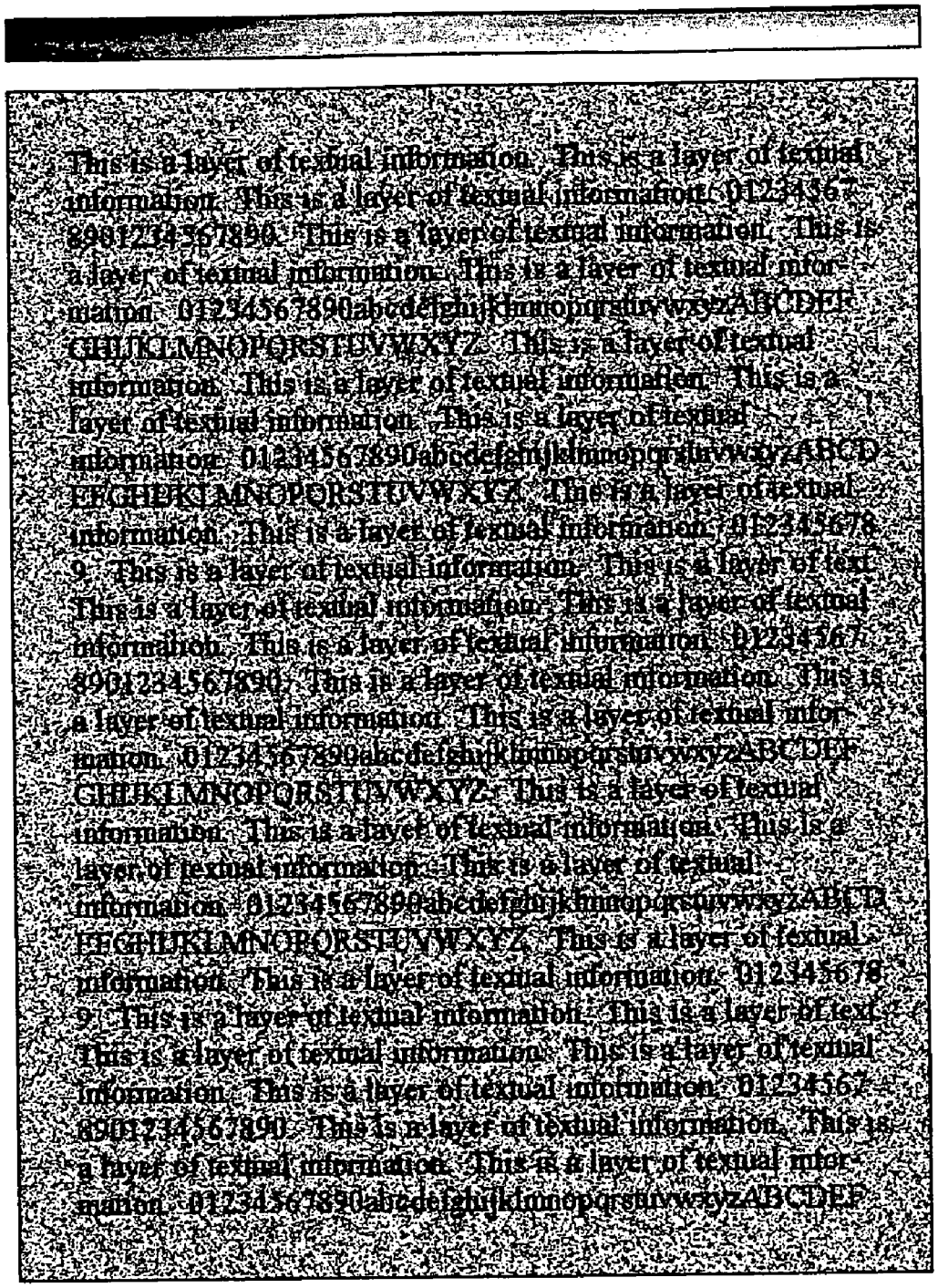
FIG. 25 is a printed hardcopy output that illustrates a complete output page containing a color gradient and bounding boxes to permit calibration and alignment of the scanning process.
Figure 26:
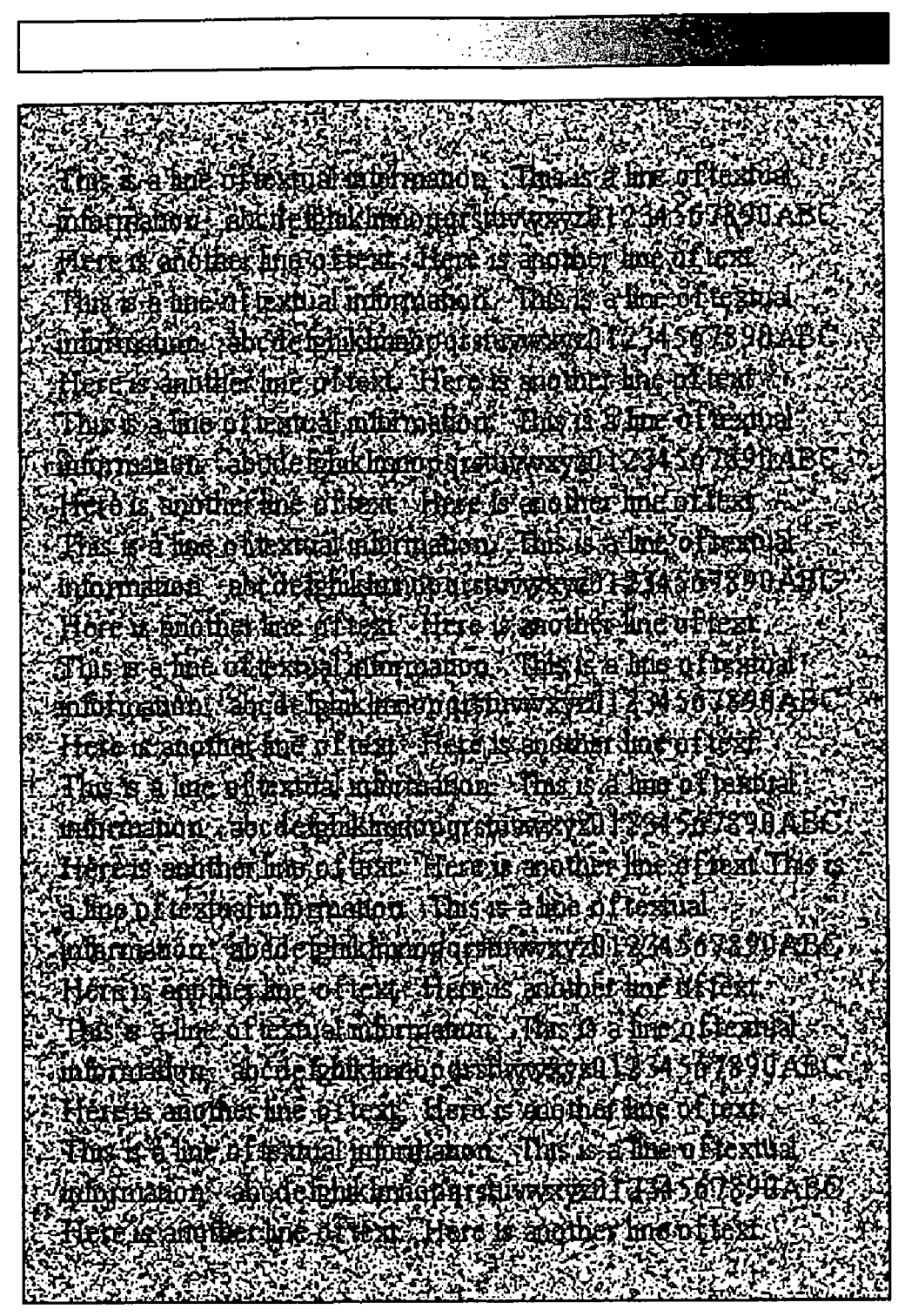

As an aid to scanning apparatus that must detect color quantizations superpixel by superpixel and detect raster scan lines with precision, a color gradient calibration can be placed on the printed media. Such a calibration is shown printed at the top of FIG. 25. Moreover, the printed first and second information is enclosed in a true black solid line that provides orientation reference for the scanning apparatus. An equivalent gray scale calibration and solid line reference is shown in the printed output of FIG. 26.

Thus a process and apparatus for recording secondary information while retaining a first information in a way that the first and second information does not interfere has been shown and described.

I claim:

1. A method of printing information on a medium, comprising the steps of:
   accepting first data representing a first information;
   accepting second data representing a second information, said second information being unrelated to and independent of said first information;
   depositing marks of a first color in accordance with said first data; and depositing marks of at least a second color and a third color in coordination with said second color marks to produce a superpixel in accordance with said second data and accommodating said marks of a first color, such that said first information and said second information are printed on the medium and are detectable from the printed medium as separate first information and second information.

2. A method in accordance with the method of claim 1 wherein said step of depositing marks of said at least a second color and a third color to accommodate said marks of said first color further comprises the step of depositing marks of said at least a second color and a third color on the medium at locations where marks of said first color are absent.

3. A method in accordance with the method of claim 1 wherein said step of depositing marks of at least a second color and a third color further comprises the step of depositing marks of a second color and a third color perceptible to a human and said step of depositing marks of a first color further comprises the step of depositing marks of a first color imperceptible to a human.

4. A method in accordance with the method of claim 1 wherein said step of depositing marks of a first color further comprises the step of ejecting drops of a first color ink and wherein said step of depositing marks of at least a second color and a third color further comprises the step of ejecting drops of a second color and a third color ink, respectively.

5. A method of printing information on a medium, comprising the steps of:
    accepting data representing a first information;
    accepting data representing a second information, said second information being unrelated to and independent of said first information; and
    depositing marks of at least two colors in coordination to produce a superpixel in accordance with said first information data and said second information data such that said first information and said second information are separately detectable from the medium, said first information data determining where a mark is to be deposited on the medium and said second information data determining a color of said marks of at least two colors in coordination to be deposited.

6. A method in accordance with the method of claim 5 wherein said step of depositing marks of at least two colors further comprises the steps of ejecting drops of a first color ink and ejecting drops of a second color ink.

7. A hardcopy output having information thereon printed by a color printing apparatus, comprising:
    a medium having a surface;
    marks of a first color deposited on said surface and arranged in a pattern to convey a first information; and
    marks of at least second and third colors deposited in a superpixel coordination of said marks of at least second and third colors on said surface in locations where said marks of said first color are absent and conveying a second information by a sequence of said second and third color marks, said second information being unrelated to and independent of said first information.

8. A hardcopy output in accordance with claim 7 wherein said marks of a first color further comprises dots of a first color ink and wherein said marks of at least a second color and a third color further comprises dots of a second color and a third color ink, respectively.

9. A hardcopy output having information thereon printed by a color printing apparatus, comprising:
    a medium having a surface;
    marks of at least first, second and third colors, said marks of second and third colors arranged in a superpixel coordination of said marks of second and third colors, deposited on said surface, arranged in a pattern to convey a first information, and said superpixel coordination disposed within at least a portion of said pattern to convey a second information.

10. A hardcopy output in accordance with claim 9 wherein said marks of a first color further comprises dots of a first color ink and said superpixel coordination of marks of a second and third color further comprises superpixels of dots of a second and third color inks.

11. A hardcopy output having information thereon printed by a color printing apparatus, comprising:
    a medium having a surface;
    marks of a first color, comprising superpixels of a first color, and marks of a second color, comprising superpixels of a second color, deposited on said surface, arranged in a pattern to convey a first information, and arranged in a sequence of said at least first and second colors within at least a portion of said pattern to convey a second information.

12. A hardcopy output in accordance with claim 11 wherein said marks of superpixels of a first color further comprises superpixels of dots of a first color ink and wherein said marks of a second color further comprises superpixels of dots of a second color ink.

13. A method of printing information on a medium, comprising the steps of:
    accepting data representing a first information;
    accepting data representing a second information, said second information adding informational value over said first information;
    depositing marks of a first color in accordance with said first data; and
    depositing marks of at least a second color in coordination with marks of a third color to produce a superpixel in accordance with said second data, such that said first information and said second information are printed on the medium and are detectable from the printed medium as separate first information and second information.

14. A method of printing information in accordance with the method of claim 13 wherein said steps of depositing marks of a first color and depositing marks of at least a second color and a third color further comprises the steps of:
    depositing marks of said first color to accommodate said marks of said second color; and
    depositing marks of said second color and said third color to accommodate said marks of said first color.

15. A method in accordance with the method of claim 14 wherein said step of depositing marks of said at least a second color and a third color to accommodate said marks of said first color further comprises the step of depositing marks of said at least a second color and a third color on the medium at locations where marks of said first color are absent.

16. A method in accordance with the method of claim 13 wherein said step of depositing marks of at least a second color and a third color further comprises the step of depositing marks of a second color and a third color perceptible to a human and said step of depositing marks of a first color further comprises the step of depositing marks of a first color imperceptible to a human.

17. A method in accordance with the method of claim 13 wherein said step of depositing marks of a first color further comprises the step of ejecting drops of a first color ink and wherein said step of depositing marks of at least a second color and a third color further comprises the step of ejecting drops of a second color ink and a third color ink.

18. A method of printing information on a medium, comprising the steps of:
    accepting data representing a first information;
    accepting data representing a second information, said second information adding informational value independent of said first information; and
    depositing marks of at least two colors in coordination to produce a superpixel in accordance with said first information data and said second information data such that said first information and said second information are separately detectable from the medium, said first information data determining where a mark is to be deposited on the medium and said second information data determining a color of said at least two colors of marks to be deposited.

19. A method in accordance with the method of claim 18 wherein said step of depositing marks of at least two colors further comprises the steps of ejecting drops of a first color ink and ejecting drops of a second color ink.

20. A hardcopy output having information thereon printed by a color printing apparatus, comprising:
    a medium having a surface;
    marks of a first color deposited on said surface and arranged in a pattern to convey a first information; and
    marks of a superpixel coordination of at least second and third colors deposited on said surface in locations where said marks of said first color are absent and conveying a second information by a sequence of said second and third color marks.

21. A hardcopy output in accordance with claim 20 wherein said marks of a first color further comprises dots of a first color ink and wherein said marks of at least second and third colors further comprise dots of a second and a third color ink, respectively.

22. A hardcopy output having information thereon printed by a color printing apparatus, comprising:
    a medium having a surface;
    marks of superpixels of a first color deposited on said surface and arranged in a pattern to convey a first information; and
    marks of superpixels of at least second and third colors deposited on said surface in locations where said marks of said first color are absent and conveying a second information by a sequence of said second and third color marks.

23. A hardcopy output in accordance with claim 22 wherein said marks of superpixels of a first color further comprises dots of a first color ink and wherein said marks of superpixels of second and third colors further comprise dots of a second and a third color ink, respectively.

24. A hardcopy output having information thereon printed by a color printing apparatus, comprising:
    a medium having a surface;
    marks of a first color deposited on said surface and arranged in a pattern of superpixels to convey a first information; and
    marks of at least second and third colors deposited on said surface in a pattern of superpixels of said at least second and third colors in locations where said marks of said first color are absent and conveying a second information by a sequence of said second and third color marks, said second information being unrelated to and independent of said first information.

25. A hardcopy output in accordance with claim 24 wherein said marks of a first color further comprises dots of a first color ink arranged in a pattern of superpixels and wherein said marks of at least a second color and a third color further comprises dots of a second color ink arranged in a pattern of superpixels.

26. A hardcopy output in accordance with claim 24 wherein said second color is perceptible to a human and said third color is imperceptible to a human.

27. A hardcopy output having information thereon printed by a color printing apparatus, comprising:
    a medium having a surface;
    marks of a first color deposited on said surface and arranged in a pattern to convey a first information; and
    marks of at least a second color perceptible to a human and a third color imperceptible to a human deposited on said surface in locations where said marks of said first color are absent and conveying a second information by a sequence of said second and third color marks, said second information being unrelated to and independent of said first information.

28. A hardcopy output in accordance with claim 27 wherein said marks of a first color further comprises dots of a first color ink and wherein said marks of a second color further comprises dots of a second color ink.

29. A hardcopy output in accordance with claim 27 wherein said marks of a first color further comprises superpixels of a first color and wherein said marks of at least a second color and a third color further comprises superpixels of a second color and a third color.

* * * * *

UNITED STATES PATENT AND TRADEMARK OFFICE
CERTIFICATE OF CORRECTION

PATENT NO.       : 7,050,195 B1
APPLICATION NO.  : 09/556965
DATED            : May 23, 2006
INVENTOR(S)      : Jones It is certified that error appears in the above-identified patent and that said Letters Patent is hereby corrected as shown below:

In the Claims

Claim 10 Col. 10 (line 13), after "of", delete "a".

Signed and Sealed this

Ninth Day of January, 2007

JON W. DUDAS
*Director of the United States Patent and Trademark Office*